Sept. 18, 1962 R. S. NEASHAM 3,054,854
ELECTROOPTICAL APPARATUS FOR PHOTOGRAPHIC RECTIFICATION
Filed Oct. 30, 1959 2 Sheets-Sheet 1

Inventor
ROBERT S. NEASHAM

By R. J. Tompkins
Attorney

Sept. 18, 1962  R. S. NEASHAM  3,054,854
ELECTROOPTICAL APPARATUS FOR PHOTOGRAPHIC RECTIFICATION
Filed Oct. 30, 1959  2 Sheets-Sheet 2

Inventor
ROBERT S. NEASHAM

United States Patent Office 3,054,854
Patented Sept. 18, 1962

3,054,854
ELECTROOPTICAL APPARATUS FOR PHOTOGRAPHIC RECTIFICATION
Robert Stevenson Neasham, Alexandria, Va.
Filed Oct. 30, 1959, Ser. No. 849,993
5 Claims. (Cl. 178—6.7)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of abandoned application Serial No. 782,611, filed December 23, 1958, for Electronic Method and Apparatus for Photographic Rectification.

The present invention relates to a method and apparatus for photographic rectification, and more particularly to a method and apparatus for rectifying aerial photographs taken at high altitudes.

Photographic rectification is the system which is used to change the geometric properties of an oblique photograph so that it will assume the characteristics of a vertical photograph. When working with aerial photography, rectification involves the changing of converging lines into parallel lines so that a superimposed grid over the photograph will result in squares.

Prior to the advent of high altitude rocket photography, it was necessary to consider the earth's surface only as a flat plane, and hence, rectification involved merely the adjustment of straight line functions. In general, rectification was accomplished by arranging a photographic enlarger at an angle above a plane surface simulating that of the camera at the time of exposure and then adjusting the distance of the lens to the image plane in such a manner that the proper scale of enlargement was achieved. This system of rectification was limited in the small angular amount of rectification which could be accomplished in one stage, and further, only short focal length cameras could be used since long focal length cameras required precise and tedious graphical solutions. More significantly, high altitude photographs in which the earth's surface is presented as a significant portion of a sphere with curvature occurring in two directions could not be rectified by known methods involving the adjustment of converging straight lines.

In order to correct the aforementioned deficiencies in known systems of rectification, it is proposed that the photographic negative be scanned by a light beam and the optical values translated into electrical signals which are used to restitute the photograph in rectified form. Such a system imposes no effective limits on the focal length of the cameras, greatly increases the amount of rectification possible in one operation and is capable of rectifying both curved and straight lines.

Accordingly, the objects of the present invention are to provide a method and apparatus for rectifying the curved lines of high altitude photographs into parallel and uniformly spaced straight lines by scanning the negative of the photograph, translating the optical values of the negative into electrical current and then restituting the photograph in rectified form.

Another object is to provide a method of scanning a high altitude aerial photograph by moving a light across the negative of the photograph in lines parallel to the horizon line.

A further object of the invention is to provide an apparatus for moving a light beam across a high altitude aerial photograph negative in lines parallel to the horizon line and for translating the optical values into electrical signals.

Still another object of the invention is to provide a method and apparatus for rectifying a high altitude aerial photograph negative by moving a light source across a photographic negative material at varying speeds whereby the aerial photograph may be restituted in rectified form.

A final object of the invention is to provide a system for rectifying a high altitude aerial photograph which produces a rectified photograph having a constant gamma.

Other objects and many of the attendant advantages of this invention will be readily appreciated as the same becomes better understood by reference to the following detailed description when considered in connection with the accompanying drawings wherein.

Figure 1:
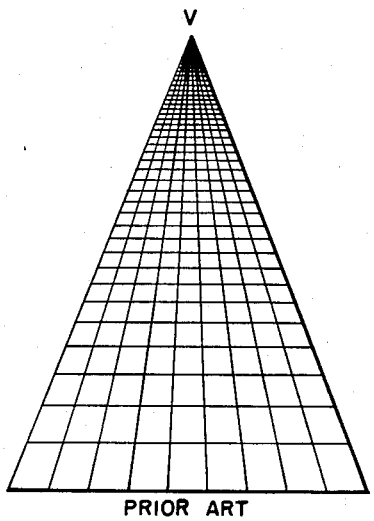
FIG. 1 illustrates a linear perspective view of the earth's surface.

Referring to FIG. 1 there is shown, by way of explanation of the lineal characteristics of low altitude photographs, a linear perspective view in which the meridian lines on the earth's surface are straight and converge toward the vanishing point V while the range lines from the camera position pile up on each other as the vanishing point is reached. Rectification of photographs of this type requires a system which simply adjusts the straight lines so that they are parallel and uniformly spaced apart.

Figure 2:
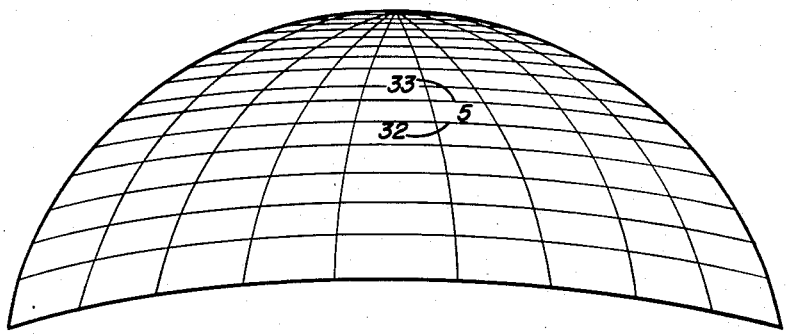
FIG. 2 illustrates a curvilinear perspective view of the earth's surface.

As shown in FIG. 2 photographs taken at high altitudes, as for example by rockets, present the earth's surface as a significant portion of a sphere instead of a flat plane so that the meridian lines and range lines appear curved, reference numeral 5 in FIG. 2 representing the negative of a typical portion to be rectified.

Figure 3:
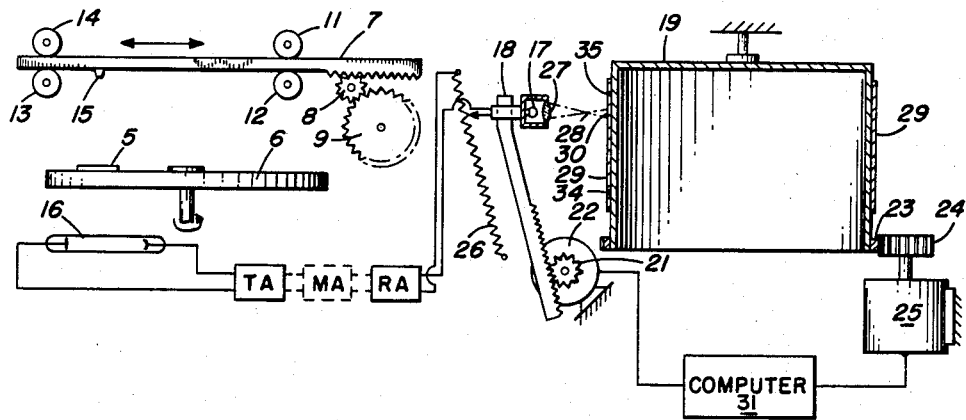
FIG. 3 is a schematic front view, partly in cross section, of the rectifying system.
Figure 4:
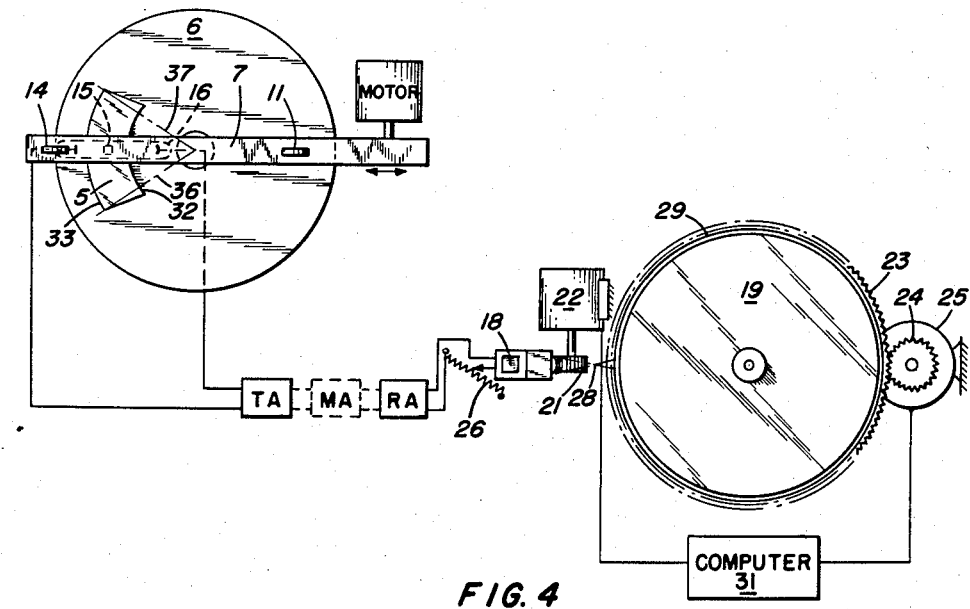
FIG. 4 is a schematic top view of the rectifying system.

Referring to FIGS. 3 and 4 there is shown a rotatable translucent disc 6 which is supported and rotated at a constant speed by any suitable means (not shown). A rack 7 is supported for movement across a diameter of the disc by rollers 11, 12, 13, and 14 and is driven by gears 8 and 9, there being secured to the under surface of the rack a scanning light 15. Positioned below the translucent disc is a photoelectric cell 16 which is connected to a transmitting amplifier TA and thence to a receiving amplifier RA. A second light source 17 and a lens 27 are fixedly mounted to a rack 18 so that light 17 will be focused to a point 28 at a predetermined distance from light source 17 and so that the axis of the lens 27 will be perpendicular to the longitudinal axis of a translucent cylindrical drum 19. A film 29 is wrapped around the periphery of drum 19 so that the light from light source 17 will be projected thereon. Light source 17 is electrically connected to receiving amplifier RA and to a potentiometer 26. The construction of potentiometer 26 is based upon the principle that the intensity of light is inversely proportional to the square of the distance from the light source. Thus, potentiometer 26 is calibrated to compensate for the increase in distance between light source 17 from film 29 as light source 17 travels toward the top of drum 19 and also to compensate for the decrease in light at the smaller scale range lines of photograph 5 so that film 29 will have the proper light intensity rectification. Rack 18 is driven by gear 21 on variable speed motor 22 and is at a predetermined angle to the longitudinal axis of drum 19 so that as light 17 travels toward the top of drum 19 the spot of light 30 projected by light source 17 on film 29 will increase in size. Drum 19 has a ring gear 23 which engages gear 24 on variable speed motor 25. Motors 22, 25 and scanning light 15 are controlled to be synchronized at various predetermined speeds by a computer 31. Computer 31 is programmed to convert the distortion of negative 5 into a single scale linear film 29.

The method and operation of the rectification device is as follows: Negative 5 is placed upon the upper surface of the disc 6 so that the range lines 32 and 33 are concentric with the disc's periphery. Disc 6 is rotated at a predetermined speed so that the scanning light 15 will scan the negative along lines which are parallel to range lines 32 and 33. Rack 7 will move the scanning light at a predetermined synchronized speed along the diameter of disc 6 from range line 32 to range line 33 as disc 6 rotates. The photoelectric cell 16 will receive the scanning beam and translate the varying optical values or densities of the negative into electrical signals which will pass through the transmitting amplifier to the receiving amplifier which in turn varies the light intensity of light source 17. At the same time the scanning beam moves from range line 32 to range line 33 on negative 5 light source 17 will travel from a predetermined location on film 29 such as range line 34 to some range line 35. These simultaneous movements are synchronized by any suitable synchronizing means which is an integral part of computer 31. It follows that range line 32 will be received upon film 29 as range line 34 and range line 33 will be received as range line 35. Both range lines 34 and 35 will be of the same scale. It will be noted that the scanning of negative 5 will compensate for the distortion of negative 5 due to the curvature of range lines 32 and 33 of negative 5 and all range lines therebetween so that the signals received by light source 17 from receiving amplifier RA represent negative 5 with the range lines straightened out. Further modifications are necessary for full rectification of negative 5 and this is accomplished at the drum end of the device. As scanner 15 travels toward range line 33 motor 25 increases the rate of rotation of drum 19, motor 22 increases the rate of travel of light source 17 toward the top of the drum, rack 18 positions light source 17 further away from the drum and potentiometer 26 increases the intensity of light source 17. These modifications to the signal from the receiving amplifier are apparent when it is realized that range line 33 on negative 5 is of a smaller scale than range line 32. Expansion of the scale of negative 5 toward range line 33 in a direction parallel to the range lines is caused by an increase in the rate of rotation of the drum 19 and expansion of the scale in a direction perpendicular to the range lines is caused by an increase in the rate of travel of rack 18 carrying light source 17. As the speed of drum 19 and rack 18 increase it is apparent that the spot 30 from the light source will not produce coverage of film 29 unless it increases in size. This is apparent from the discussion of the photograph or negative 5 of FIG. 2. A scanning spot of finite and fixed dimensions will scan the photograph 5. The actual area scanned on the photograph 5 is the same at the bottom and at the top, which has a reduced scale. Since the scanning spot functions in the form of an extremely closely spaced linear array of parallel lines, it can be seen that when the scanned image from negative 5 is rectified onto the film 29, the line array formed by the printing spot 30 of light source 17 would tend to be in the form of an array of divergent lines with the space increasing between each line as the scale expands if the spot size was not increased. Under such an assumed condition it can be seen that if the printing scan lines just come into contact with each other at the lower end of the film and if the upper end of the film 29 had an expanded scale of 2:1, the upper end of the exposed film would be in the form of alternately printed lines and blank spaces of equal width; therefore accuracy would suffer. To overcome this feature the size of the printing spot 30 is increased as the scale expands and the spaces which otherwise would be blank are effectively filled with the rectified information. This increase in size of spot 30 is taken care of by the angle of tilt of rack 18 to drum 19 so that as the speed of the rack increases the distance of light source 17 from the drum increases thereby causing the spot 30 to enlarge.

It is now apparent that since spot 30 increases in size that the intensity of the spot will decrease unless the intensity of light source 17 is increased. This decreased intensity and an increase in vertical printing speed would tend to reduce the time of exposure of the film 29 and would therefore produce a corresponding reduction in reproduction accuracy. The intensity of the light source is increased by the contact that the light source makes with potentiometer 26. The speed at which motor 25 drives drum 19 and the speed at which motor 22 drives rack 18 is governed by computer 31. The proper speeds will vary depending upon the scale of negative 5 and the desired scale of negative 29 and for each rectification computer 31 must be programmed to suit such circumstances. In order to simplify the programming of the computer it may be desirable to scan negative 5 by back and forth movement across the negative. If this is to be done, instead of rotating disc 6 all the way around the disc will be rotated that distance required for scanner 15 to scan the negative whereupon the disc will rotate in the opposite direction so that scanner 15 will not scan in that sector of the disc not covered by the negative. Likewise drum 19 will not rotate all the way around but will rotate back and forth only in that sector of the drum which is appropriate to the sector of movement of the disc. This correlated movement is achieved through synchronizing means present in computer 31. It is to be noted that if such method is employed only part of negative 5 will be scanned, namely the part within the confines of radials 36 and 37 of disc 6 or any other desired set of radials from disc 6. By the movement of disc 6 as described above computer 31 need not be programmed to allow for movement of scanner 15 in that sector of the disc not covered by negative 5.

If desired, the electrical signals transmitted by amplifier TA may be recorded on a magnetic tape recorder MA and the photographic image restituted in rectified form at a later time.

Obviously many modifications and variations of the present invention are possible in the light of the above teachings. It is therefore to be understood that within the appended claims the invention may be practiced otherwise than as specifically described.

What is claimed is:

1. A device for rectifying a high altitude photograph having curved range lines comprising a translucent photograph support surface, a scanning means mounted adjacent one side of said surface for passing a beam of light through said surface, means for moving said scanning means in a predetermined manner relative to said surface along the curved range lines, photoelectric means mounted adjacent the opposite side of said surface and formed to receive the beam of light passing through said surface and convert it to electrical signals, amplifier means for transmitting the electrical signals obtained from scanning said negative, means for converting the electrical signals into light energy, a receiving negative and a photographic film mounting surface, a variable speed motor drivingly connected to said surface, a variable speed motor drivingly connected to said means for converting the electrical signals into light energy and a computer programmed to control the movements of said photographic film mounting surface and the movements of said means for converting electrical signals into light energy according to the desired rectification.

2. A device for rectifying a photograph comprising a rotatable transparent circular disc formed to receive a negative of said photograph thereon so that the periphery of said disc is parallel to the range lines of said negative, means for rotating said disc at a predetermined constant speed, a scanning light, means for moving said scanning light across said negative at a rate synchronized with the rotation of said disc along a radial of said disc while said disc is rotating, a photoelectric cell for receiving the light from said scanning light after the light passes through said negative and said disc for converting the light received into proportional electrical signals, means for transmitting the electrical signals obtained from scanning said negative, a photographic film, a translucent rotatable drum adapted to receive said photographic film around the periphery thereof, means for rotating said drum, a light source directed on said photographic film having the intensity thereof controlled by said electrical signals, a lens for focusing said light source to a beam of predetermined size and means for moving the beam of said light source in a predetermined path across said photographic negative at a rate correlated with the rate of rotation of said drum, said disc and the movement of said scanning light, whereby the photograph on said negative is transferred to said film with the desired rectification.

3. The device as claimed in claim 2 wherein the means for moving the beam of said light source in a predetermined path across said photographic film comprises a holder means for said light source, said holder means being positioned so that said light source will traverse the photographic film in a path which is toward one end of the drum, which is in a plane containing the longitudinal axis of the drum and which is at an angle to the longitudinal axis of the drum so that the spot of said beam on said photographic film will increase in size as said light source travels toward said end of the drum.

4. The device as claimed in claim 3 including a computer adapted to be programmed to control the movements of the drum and the movements of the light source so that the desired rectification will be attained.

5. The device as claimed in claim 4 including means for varying the intensity of the light source as it advances in said path so that compensation will be effected for the decrease in the light intensity of the beam on the photographic film due to the path travelled by said light source and so that the light density on the negative of the photograph will be changed to the desired rectified light density to be imposed on the photographic film.

References Cited in the file of this patent

UNITED STATES PATENTS

| 1,855,370 | Trenor | Apr. 26, 1932 |
| 2,604,955 | Hawkins | July 29, 1952 |
| 2,617,337 | Synder | Nov. 11, 1952 |
| 2,839,974 | Reiner et al. | June 24, 1958 |

OTHER REFERENCES

Photogrammetric Engineering, volume XXI, Issue No. 4, pp. 543–555, September 1955.

UNITED STATES PATENT OFFICE

CERTIFICATE OF CORRECTION

Patent No. 3,054,854            September 18, 1962

Robert Stevenson Neasham

It is hereby certified that error appears in the above numbered patent requiring correction and that the said Letters Patent should read as corrected below.

Column 4, line 57, "receiving negative and" read -- photographic film, --.

Signed and sealed this 19th day of March 1963.

(SEAL)
Attest:

ESTON G. JOHNSON
Attesting Officer

DAVID L. LADD
Commissioner of Patents